US012716272B2

(12) United States Patent
Cordova et al.

(10) Patent No.: US 12,716,272 B2
(45) Date of Patent: Aug. 25, 2026

(54) HIGH SECURITY HASP FOR HIDDEN SHACKLE LOCK

(71) Applicant: Corbas Marketing, Inc., North Hollywood, CA (US)

(72) Inventors: Carlos Cordova, North Hollywood, CA (US); Sammy Vargas, North Hollywood, CA (US)

(73) Assignee: Corbas Marketing, Inc., North Hollywood, CA (US)

( * ) Notice: Subject to any disclaimer, the term of this patent is extended or adjusted under 35 U.S.C. 154(b) by 79 days.

(21) Appl. No.: 18/126,305

(22) Filed: Mar. 24, 2023

(65) Prior Publication Data

US 2024/0318468 A1 Sep. 26, 2024

(51) Int. Cl.
*E05B 65/48* (2006.01)
*E05B 67/38* (2006.01)

(52) U.S. Cl.
CPC .............. *E05B 65/48* (2013.01); *E05B 67/38* (2013.01); *E05B 67/383* (2013.01)

(58) Field of Classification Search
CPC .......... E05B 65/48; E05B 67/36; E05B 67/38; E05B 67/383
See application file for complete search history.

(56) References Cited

U.S. PATENT DOCUMENTS 688,747 A * 12/1901 McMillem .............. E05C 19/08 292/281
2,046,078 A * 6/1936 Marshall ................. E05C 19/08 292/281
2,183,834 A 12/1939 Ferris
3,945,227 A * 3/1976 Reiland ............... E05B 73/0082 70/DIG. 57
3,996,774 A * 12/1976 Best ......................... E05B 67/36 70/32
4,569,545 A 2/1986 Hartmann et al.
4,852,920 A * 8/1989 DeForrest, Sr. ........ E05B 67/38 292/281
4,866,960 A 9/1989 Brower
5,172,574 A 12/1992 Perfetto
5,404,734 A * 4/1995 Martinez ................... E05C 1/04 70/180
5,409,276 A * 4/1995 Engasser ............... E05C 19/188 292/281
6,601,413 B1 * 8/2003 Vito ......................... E05B 67/38 70/56
6,766,671 B2 * 7/2004 Haczynski ............ E05B 67/383 70/56
7,290,415 B2 11/2007 Rosenberg et al.
7,562,546 B2 7/2009 Taylor
8,266,932 B2 9/2012 Longwell
(Continued)

*Primary Examiner* — Christopher J Boswell
(74) *Attorney, Agent, or Firm* — McConnell Law Firm PC; Robert McConnell

(57) ABSTRACT

An improved hasp for use with a hidden shackle pad lock. The hasp is manufactured of high strength steel and includes a tamper proof hinge with a domed pin. Further the shackle is mounted on high strength laminated steel mounting plates for additional security. The device includes a protective shroud for the hidden shackle lock with offset breaks in the shroud to prevent cutting the lock with a grinder. Further the configuration of the shackle allows use on openings that need to be secured, particularly those on boxes for public utilities (utility boxes).

7 Claims, 8 Drawing Sheets

(56) References Cited

U.S. PATENT DOCUMENTS

| | | | | |
|---|---|---|---|---|
| 8,273,984 | B2 | 9/2012 | Combs et al. | |
| 9,184,573 | B1 * | 11/2015 | Jonas | E05B 65/0089 |
| 11,274,472 | B2 | 3/2022 | Lasquete | |
| 2005/0247084 | A1 | 11/2005 | Rosenberg et al. | |
| 2005/0252257 | A1 | 11/2005 | Woods et al. | |
| 2012/0144883 | A1 | 6/2012 | Longwell | |
| 2014/0260445 | A1 | 9/2014 | Vellani | |
| 2017/0037662 | A1 | 2/2017 | Braun | |
| 2021/0381280 | A1 | 12/2021 | Lee, II et al. | |
| 2022/0170296 | A1 | 6/2022 | Lasquette | |
| 2023/0212895 | A1 * | 7/2023 | Hodge | E05B 67/383 70/78 |

* cited by examiner

HIGH SECURITY HASP FOR HIDDEN SHACKLE LOCK

BACKGROUND OF THE INVENTION

Field of the Invention

This invention relates to a high security hasp that couples with a lock to secure cabinets, utility cabinets, doors, openings or other locked areas. A hasp is formed of metal plates that are fastened together with a lock to secure a door or an opening. These doors or openings may be on any opening, doorway, cabinet, or any device that needs to be secured by a lock.

The shackle of a padlock is a bar that is locked/secured to the body of the lock when in the locked position and unsecured/free from the lock in the unlocked position. In a typical padlock, the shackle is a U-shaped bar that loops around from one side of the padlock to the other. When the padlock is locked, the U-shaped shackle is secured to both sides of the lock. When the padlock is unlocked, the U-shaped shackle is free from one side of the lock so that the padlock can be removed from the hasp.

A hasp for a typical padlock with a U shaped exposed shackle includes two metal plates, with each of the metal plates attached to one side of the door or opening to be secured. This type of hasp generally has a first metal plate with a raised loop that fits through a complementary slot on the second metal plate. The shackle of the pad lock fits through the loop and once the pad lock is locked, the shackle prevents moving the raised loop of the first plate through the complementary slot of the second metal plate. This secures the first metal plate to the second plate.

A second type of padlock is a hidden shackle pad lock. This type of pad lock is sometimes referred to "puck" type pad locks. This type of lock is round, with a key hole on the vertical side of the lock. In this type of lock, the shackle is hidden in a compartment on the rear side of the lock. The shackle comprises a straight bar that is secured to both sides of the lock in the locked position. In the unlocked position, the shackle retracts into the body of the lock. In a typical padlock, the U-shaped shackle is a weak point and can be cut more easily than the body. With a hidden shackle padlock, the shackle is hidden behind the body of the lock. Hidden shackle padlocks are typically made of hardened steel that is difficult to cut. This configuration makes hidden shackle padlocks more difficult to cut and thus more secure.

A second type of hasp is secured by a hidden shackle pad lock. This second type of hasp has a first raised metal tab and a second raised metal tab, each with a circular opening through the tab. The tabs are sized to fit in the compartment at the rear of a hidden shackle lock, the circular openings sized such that the shackle of a hidden shackle pad lock with fit through them and the tabs oriented such that when the shackle is routed through the circular openings and locked, that the lock secures the first raised metal tab to the second raised metal tab. Securing the first raised metal tab to the second raised metal tab secures the two sides of any opening that needs to be secured.

Hasps are generally manufactured of high strength steel but can also be made of stainless steel, aluminum, or cast iron.

Prior art hasps designed to be used with hidden shackle have a variety of shortcomings including that they can be easily removed from a door/opening or may be cut in half to separate the two halves of the hasp.

SUMMARY OF THE INVENTION

The present invention is an improved hasp for use with a hidden shackle pad lock. The improved device is manufactured of high strength steel and includes a tamper proof hinge with a domed pin. Further the shackle is mounted on high strength laminated steel mounting plates for additional security. The device includes a protective shroud for the hidden shackle lock with offset breaks in the shroud to prevent cutting the lock with a grinder. Further the configuration of the shackle allows use on openings that need to be secured, particularly those on boxes for public utilities (utility boxes).

DESCRIPTION OF THE PREFERRED EMBODIMENT

The following detailed description refers to the preferred embodiment of the disclosed invention as shown in the attached figures and in the below description. This detailed description is not meant to limit the scope of the invention in any way but is intended to disclose the preferred embodiment/best mode of the invention at the time of filing this application.

Figure 1:
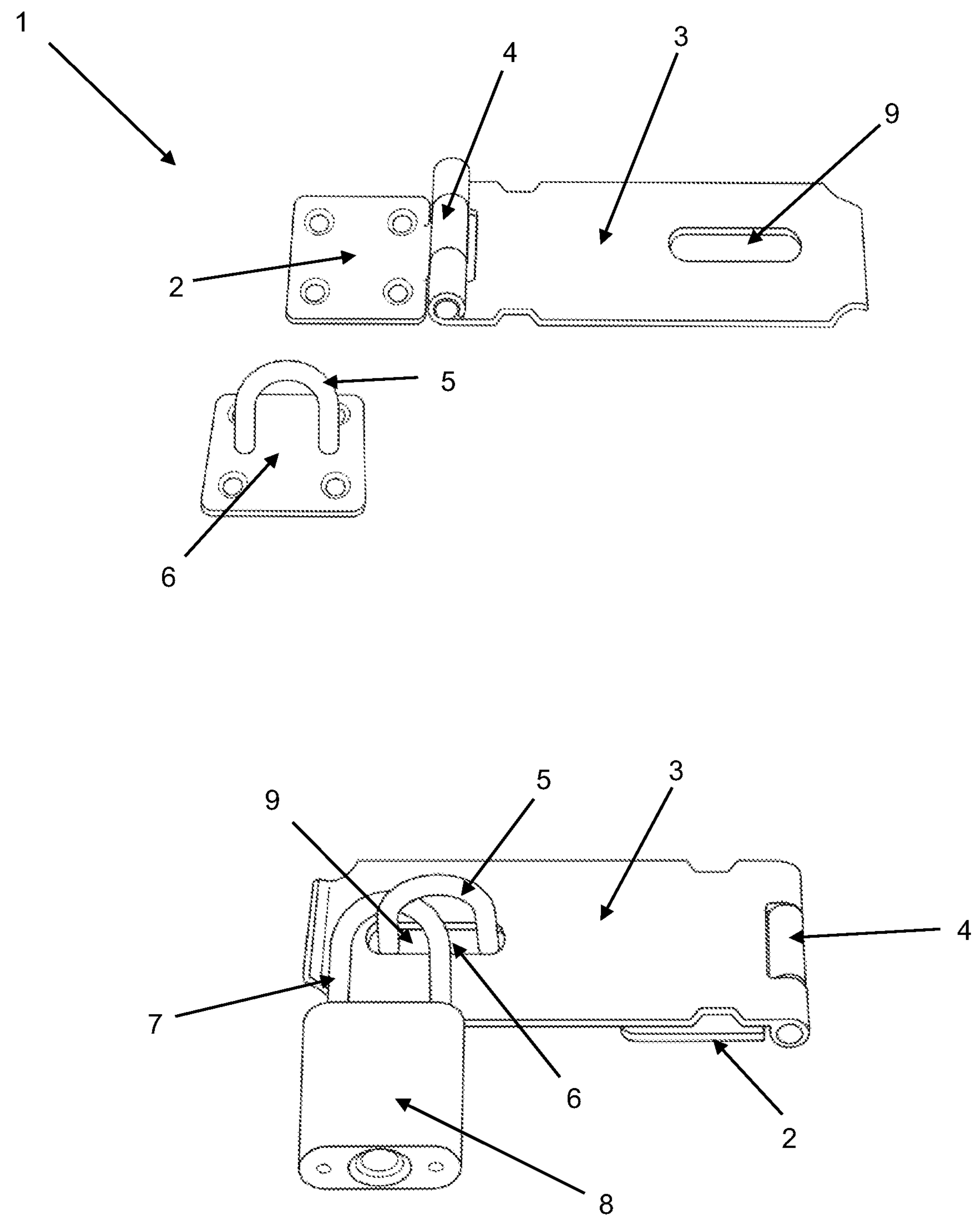
FIG. 1 is a view of a prior art hasp for a pad lock with a U shaped shackle.

FIG. 1 is a view of a prior art hasp 1 to be used with a U shaped shackle type pad lock 8. Prior art hasp 1 secures a first side of an opening to a second side of an opening. Such an openings could include a door, a cabinet door or any other opening that needs to be secured with a pad lock.

First securing plate 2 is attached to one side of the opening to be secured. First securing plate 2 is attached to hinge 4 that is connected to first plate 3. First plate 3 includes slot 9 that is sized to fit over loop 5 which is connected to second securing plate 6. Second securing plate 6 is attached to the other side of the opening to be secured with the hasp 1 and pad lock 8. Loop 5 fits through slot 9 with U shaped shackle 7 of pad lock 8 routed through loop 5. When pad lock 8 is locked, U shaped shackle 8 is locked into place, thus securing loop 5 and second securing plate 6 to first plate 3 and first securing plate 2. When this process is complete, the first side of an opening is secured to the second side of that opening with pad lock 8.

Figure 2:
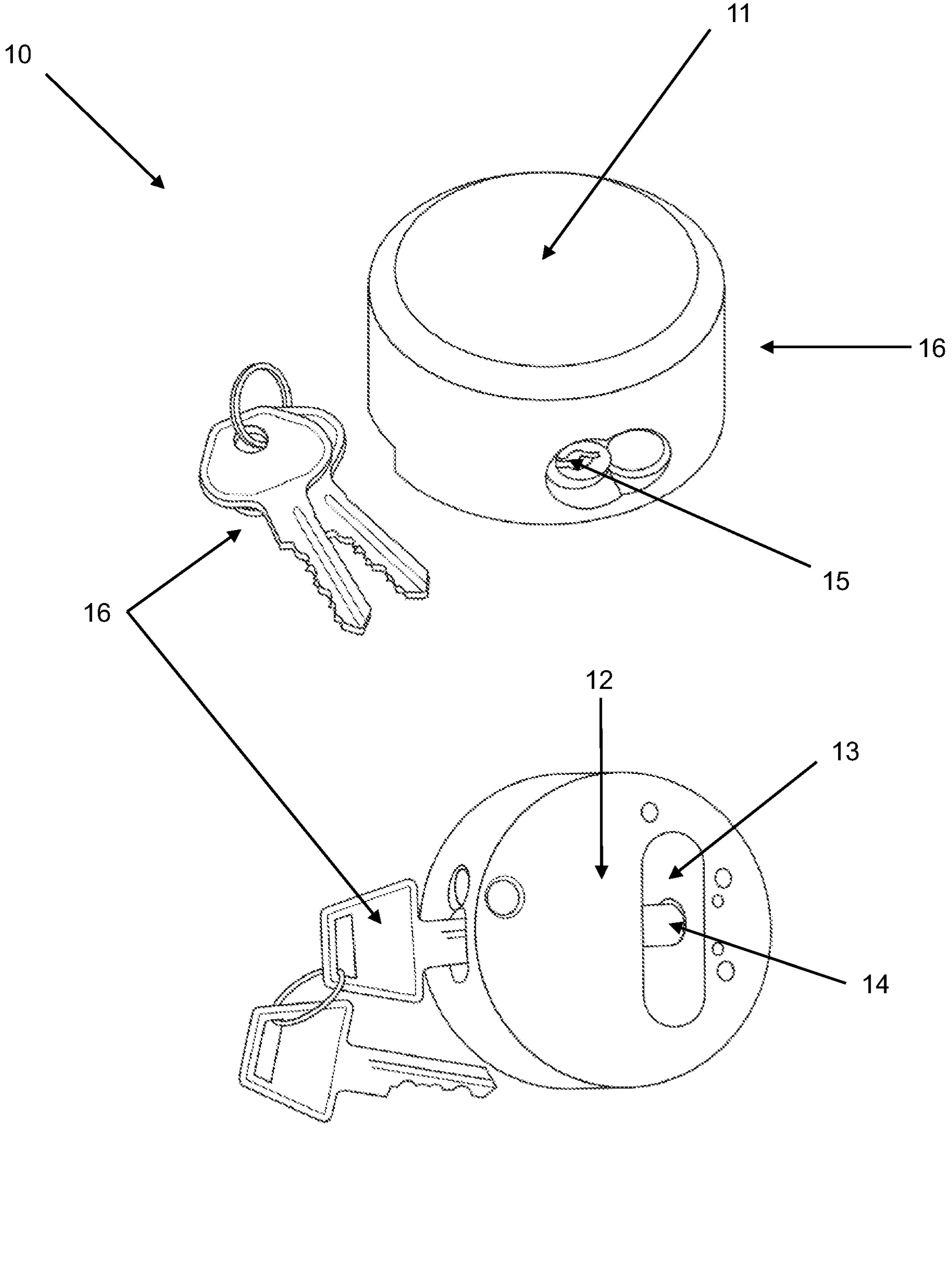
FIG. 2 is a front and rear view of a hidden shackle pad lock.

FIG. 2 is a view of the front and back of a hidden shackle pad lock 10. Front side 11 is the portion of the lock that is visible when the lock is attached and locked to a hasp. The vertical side 16 of pad lock 10 contains key hole 15. Key 16 is rotated in key hole 15 to lock and unlock pad lock 10. Rear side 12 of pad lock 10 contains compartment 13 with containing shackle 14. Shackle 14 is shown in the locked position. In the unlocked position, shackle 14 retracts into the body of pad lock 10.

Hidden shackle pad lock 10 provides improved security because the normally vulnerable shackle 14 is hidden behind the body of pad lock 10. Typically, U shaped shackle 7 of pad lock 8 is the targeted for cutting by thieves. Because shackle 14 of hidden shackle pad lock 10 is hidden behind the substantial body of pad lock 10, it is very difficult to access and cut. Hidden shackle pad lock 10 is often made of high strength metal, specifically high strength steel that is difficult to cut, even with power tools. The length of time it takes to cut through the body of pad lock 10 and the noise generated by the tools necessary to perform such cutting exposes thieves to detection and capture. This additional body strength and hidden shackle, make hidden shackle pad lock 10 more secure that pad lock 8 with U shaped shackle 7.

Figure 3:
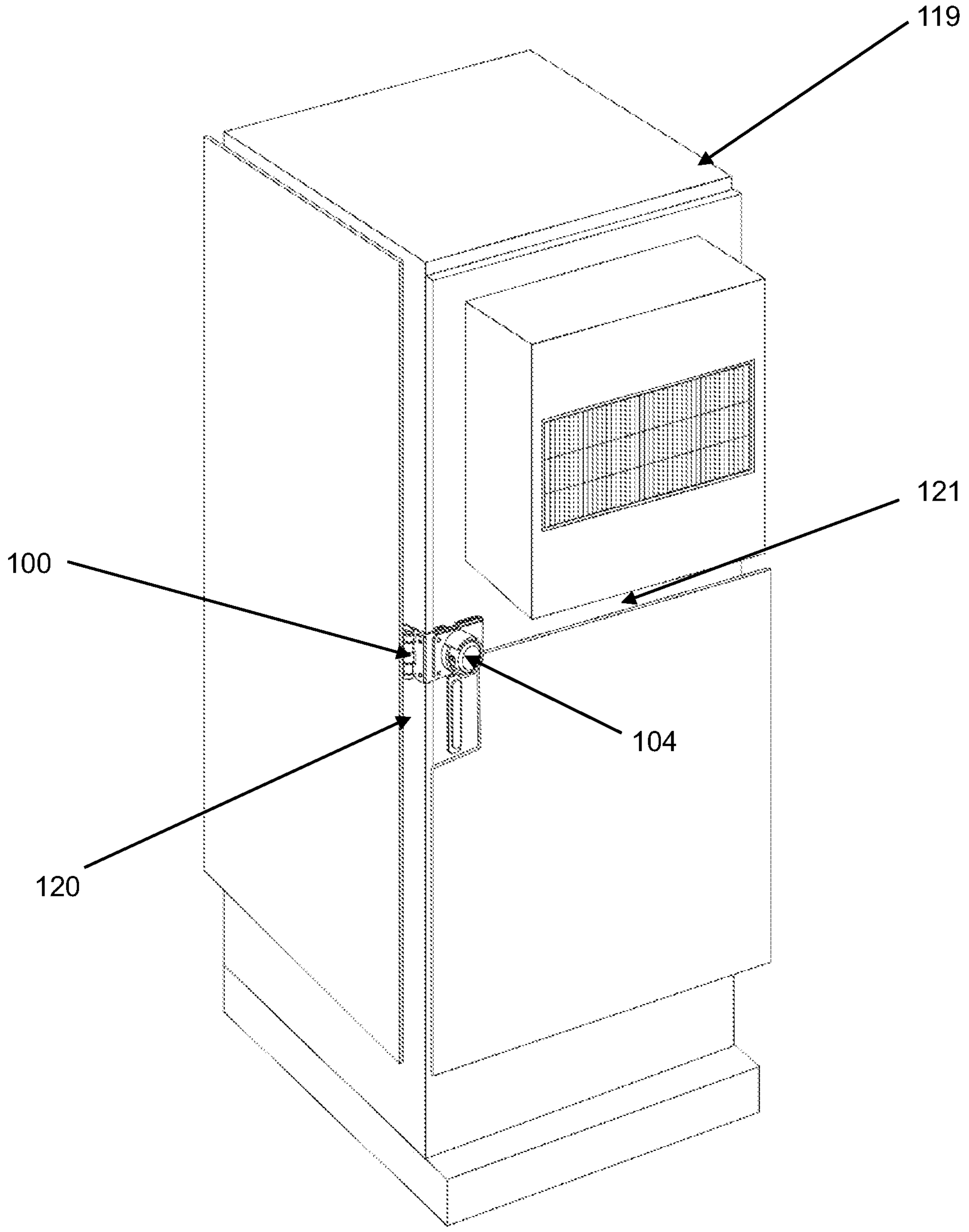
FIG. 3 is a view of the improved hasp secured on a utility box.

FIG. 3 shows the improved high security hasp 100 installed on a utility cabinet 119. In this view, hasp 100 is installed between the utility cabinet side 120 and utility cabinet door 121. Pad lock 104 is shown locked in place on hasp 100.

Figure 4:
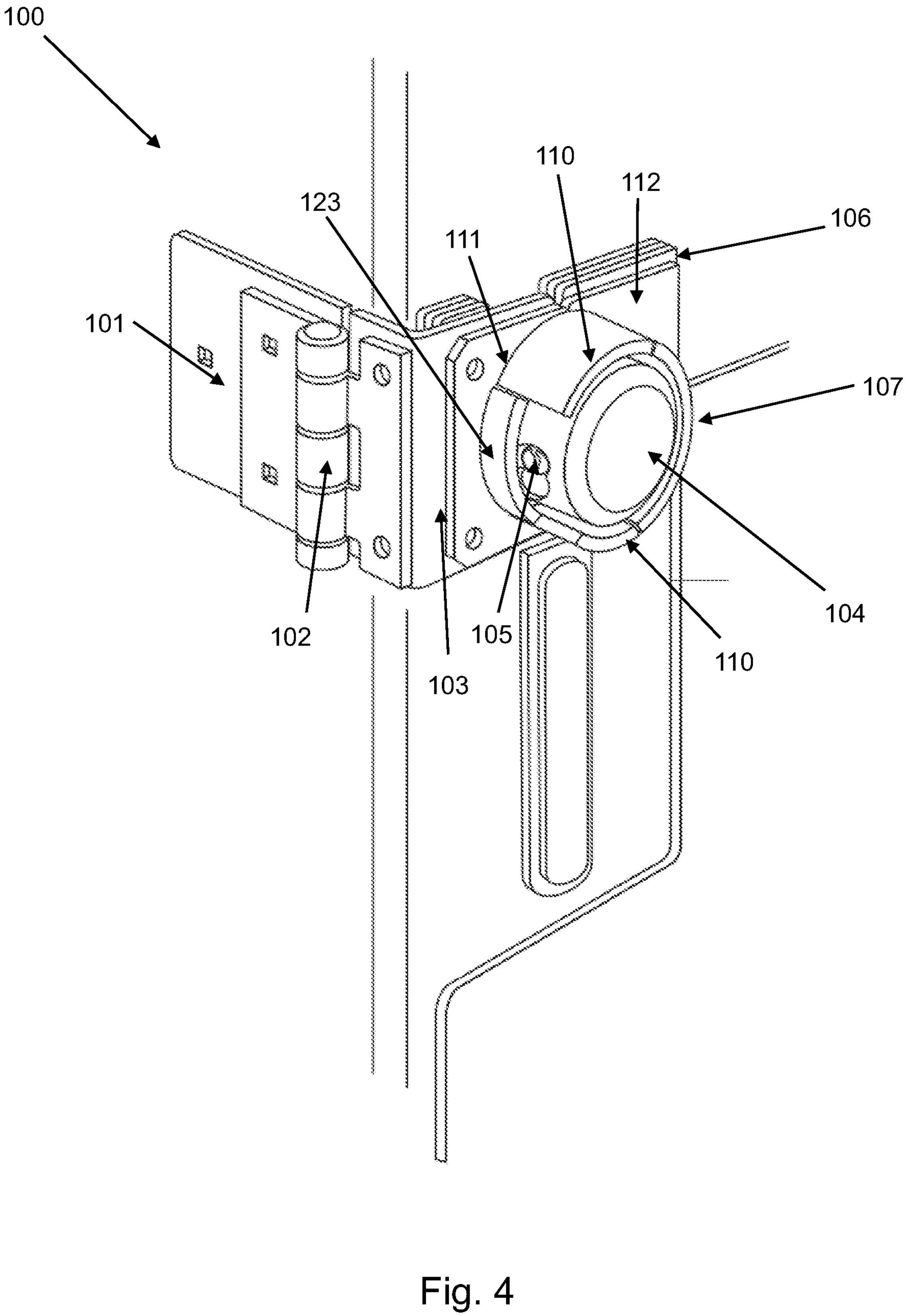
FIG. 4 is a detailed perspective view of the improved hasp secured with a hidden shackle padlock.

FIG. 4 shows a detailed view of high security hasp 100 installed on a utility cabinet with pad lock 104 locked in place. Hasp 100 is comprised of first securing plate 101, hinge 102, second securing plate 103 and third securing plate 106. In this view, hasp 100 is shown with hidden shackle pad lock 104 installed with pad lock front side 109 shown. Pad lock 104 includes key hole 105 on the vertical side wall of pad lock 104. In the preferred embodiment, first securing plate 101 is attached to utility cabinet side wall with a carriage bolt and is formed of high strength steel.

Hinge 102 is attached to one end of first securing plate 101 and to one end of second securing plate 103. Hinge 102 is a high security hinge with a domed pin that is difficult to cut with a grinder or other power tool. In the preferred embodiment, hinge 102 is made of high strength steel and securely welded to first securing plate 101 and second securing plate 103. Welding is used in the preferred embodiment, but any method of connection well known in the art could be used such as casting or forging. Hinge 102 could be formed as a portion of both first securing plate 101 and/or second securing plate 103.

In the preferred embodiment, second securing plate 103 is L shaped with a right angle in the plate that allows the hinge to be positioned along the utility cabinet side 120 while attached to one side of second securing plate 103 while the front side of the second securing plate 103 is oriented along the utility cabinet door 121. First lock base 111 is attached to second securing plate 103. First lock base 111 comprises the first raised vertical tab to couple with the shackle of pad lock 104. First lock base 111 also comprises first lock shroud 110. First lock shroud 110 is a semi-circular raised shroud that provides additional protection from cutting for pad lock 104. The edges of first lock shroud 110 tightly couple with complementary edges of second lock shroud 107, which is attached second lock base 112 which is positioned on third securing plate 103. Second lock base 112 includes a second raised vertical tab that couples with the shackle of pad lock 104 to secure first lock base 111 and second lock base 112 to each other. In the preferred embodiment, first lock base 111 and second lock base 112 are welded securely to second securing plate 103 and third securing plate 106. When compartment 13 of pad lock 104 is positioned over the raised vertical tabs of first lock base 111 and second lock base 112 and the shackle is routed through the tabs, second securing plate 103 is locked securely to third securing plate 106. This locked position securely locks utility cabinet door 121 closed.

As an additional security measure, third lock shroud 123 provides protection against accessing the rear of lock 104. Third lock shroud 123 has a reduced wall height, to provide access to key hole 105. However, third lock shroud 123 has wall height sufficient to guard against a thief lifting lock 104 to gain access to the rear of the lock. Third lock shroud 123 prevents lifting lock 104 to gain access to the rear of lock 104. This provides additional protection from prying lock 104 away from hasp 100. The combination of first lock shroud 110, second lock shroud 107, and third lock shroud 123 provide 360 degree protection for lock 104 to fortify hasp 100 against cutting or prying of lock 104.

The components of improved security hasp 100 including first securing plate 101, hinge 102, second securing plate 103, first lock base 111, second securing plate 106, second lock base 112, first lock shroud 110 and second lock shroud 107 are made of high strength steel in the preferred embodiment. The components may be cast, forged or cut with a variety of methods to form the items. While high strength steel is used in the preferred embodiment, other materials may be utilized such as stainless steel, aluminum, cast iron or any other high strength material known in the art. Manufacturing methods such as casting, forging, welding, CNC cutting and plasma cutting may be used in the manufacture of each of the component parts.

Figure 5:
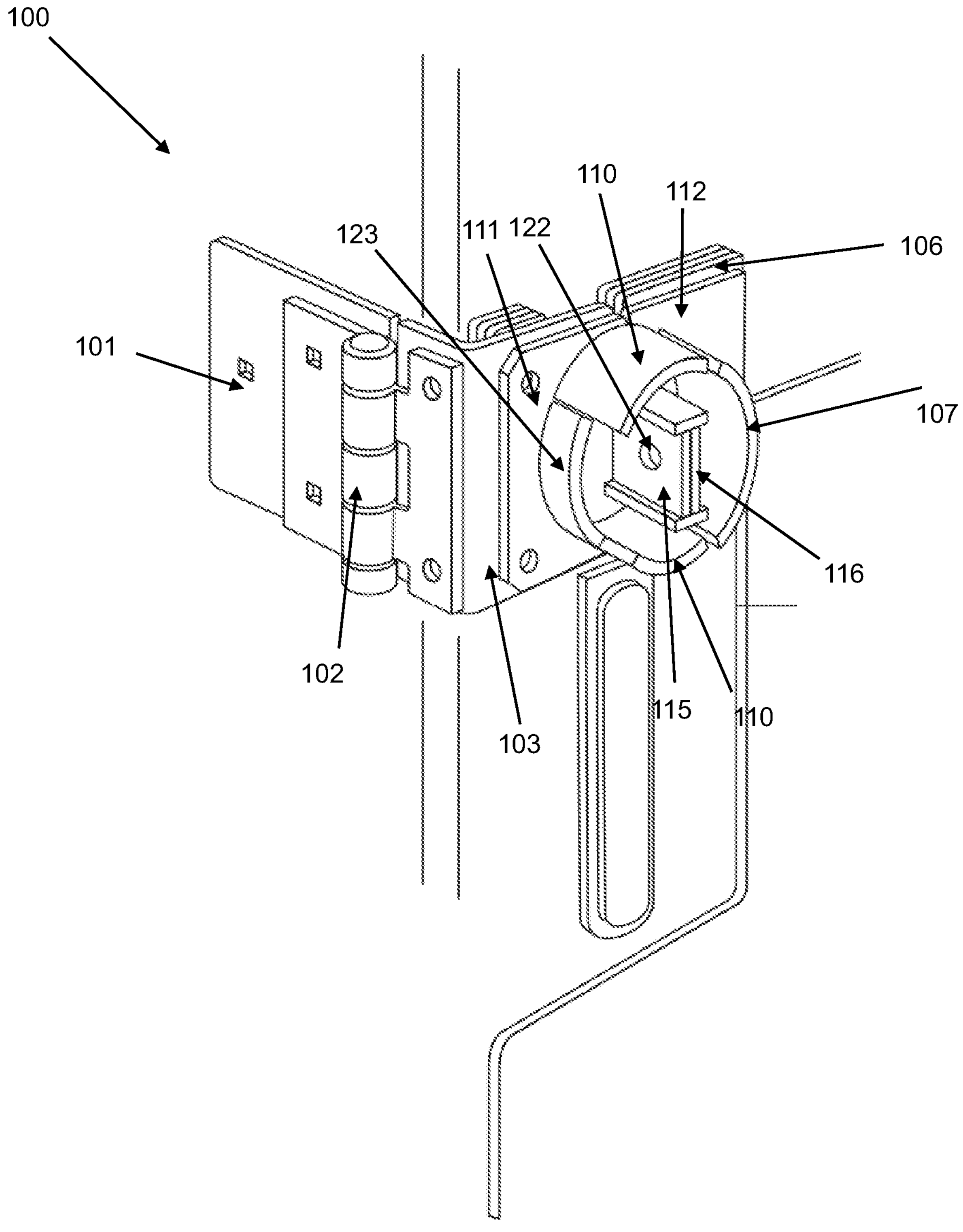
FIG. 5 is a detailed perspective view of the improved hasp secured without a hidden shackle padlock installed.

FIG. 5 shows improved security hasp 100 without pad lock 104 attached. In this view all the constituent components show in FIG. 3 are included. Further, the first raised vertical tab 115 of first lock base 111 and second raised vertical tab 116 of second lock base 112 are visible. First raised vertical tab 115 and second raised vertical tab 116 include shackle slots 122 designed to fit the shackle 14 of pad lock 104. The shackle of pad lock 104 fits through each of the shackle slots 122 and when locked, secure first lock base 111 and second lock base 112 and thus second securing base 103 and third securing base 106 to each other. Locking second securing lock base 103 to third securing lock base 106 allows the door of utility cabinet to be secured to the side wall of utility cabinet.

As an additional security measure, third lock shroud 123 provides protection against accessing the rear of lock 104. Third lock shroud 123 has a reduced wall height, to provide access to key hole 105. However, third lock shroud 123 has wall height sufficient to guard against a thief lifting lock 104 to gain access to the rear of the lock. Third lock shroud 123 prevents lifting lock 104 to gain access to the rear of lock 104. This provides additional protection from prying lock 104 away from hasp 100. The combination of first lock shroud 110, second lock shroud 107, and third lock shroud 123 provide 360 degree protection for lock 104 to fortify hasp 100 against cutting or prying of lock 104.

Figure 6:
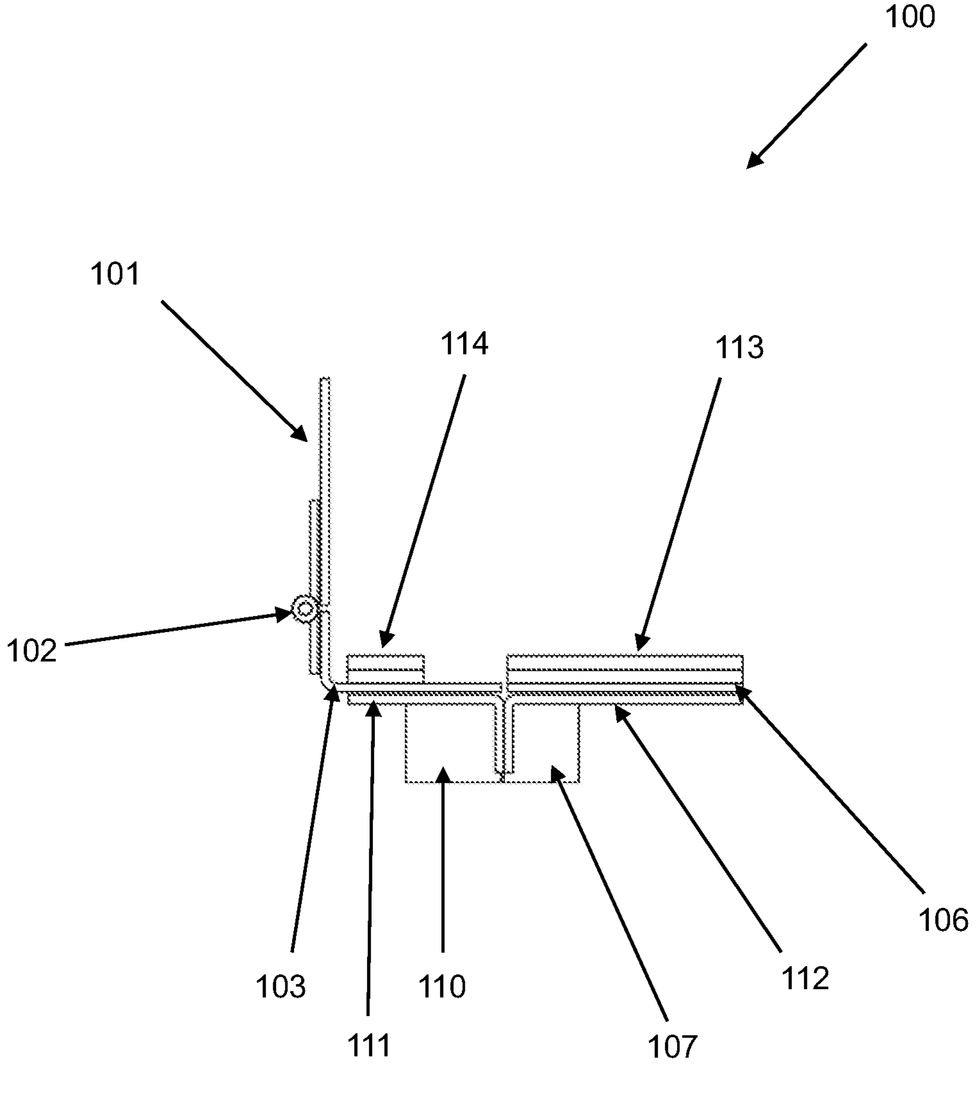
FIG. 6 is top view of the improved hasp.

FIG. 6 shows a top view of improved security hasp 100. In this view, first securing plate 101, hinge 102, second securing plate 103, first lock base 111, first lock shroud 110, second lock base 112, second lock shroud 107 and third securing plate 106 are shown as described in relation to FIGS. 3 and 4. Also shown in this figure are first security base 114 and second security base 114. First security base 114 and second security base 113 are stacked, laminated high strength steel that provide security support for improved security hasp 100. First security base 114 provides additional laminated high strength steel support for the improved security hasp 100 at a potential weak point, making it much more difficult to break apart or cut with existing tools. Second security base 113 provides a high strength mounting point for third securing plate 106. First security base 114 and second security base 113 are made of stacked, laminated high strength steel, making them very difficult to cut or drill. While in the preferred embodiment, they are made of high strength steel, any high strength material such as stainless steel, aluminum, or cast iron.

Figure 7:
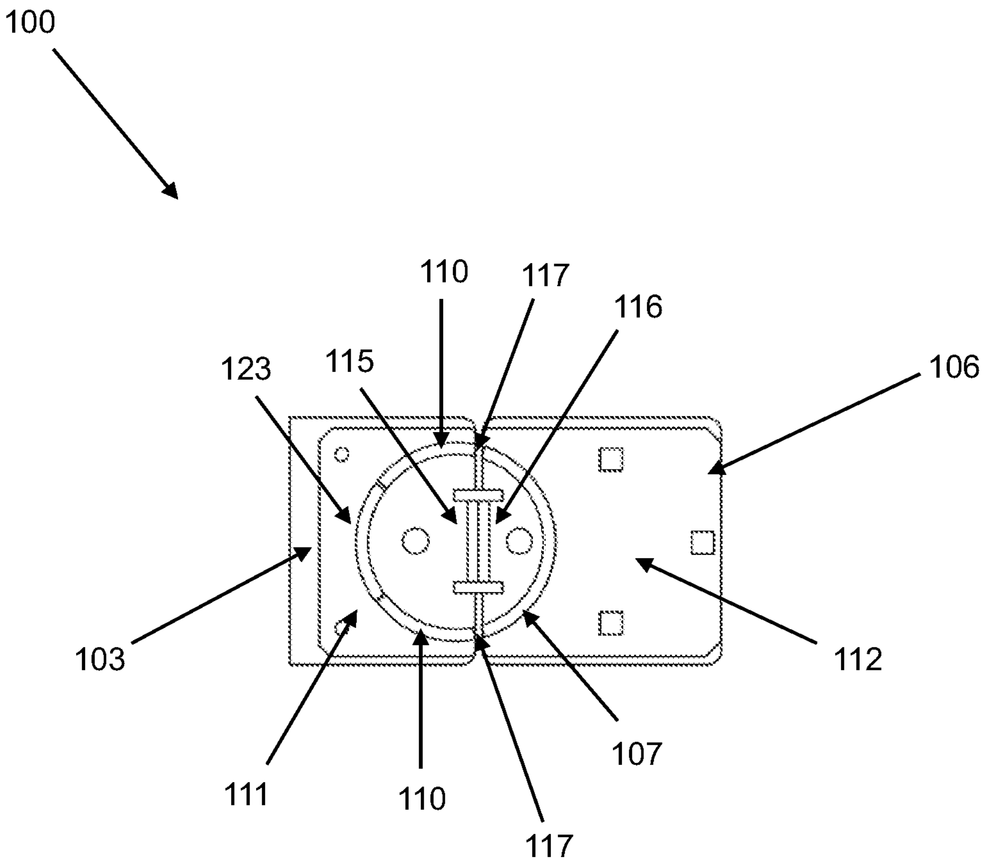
FIG. 7 is a front view of the improved hasp.

FIG. 7 is a front view improved security hasp 100. In this view, the orientation of first lock shroud 110 and second lock shroud 107 is shown. Here, shroud gaps 117 are directly across from each other, i.e. a straight line could be drawn from one gap to the other. In other embodiments, the shroud gaps can be offset, meaning that a straight line drawn from the first gap would not intersect with the second gap. Offset shroud gaps 117 provide an additional layer of security. A thief attempting to use a grinder or other cutting tool to cut through a hidden shackle lock may attempt to start such a cut in the lock shroud gap 117. If the lock shroud gap 117 are offset, any cut through one gap will intersect with the other side of the lock shroud, i.e., not with the opposite shroud gap 117. This requires additional cutting through high strength steel. This cutting is time consuming and generates significant noise, so any additional time required increases a thief's risk of detection in the act, thus improving the security of the device.

Also shown are first raised vertical tab 115 and second raised vertical tab 116. These tabs are oriented to fit in the compartment 13 of pad lock 104 and to couple with shackle 14 of the lock. First raised vertical tab 115 and second raised vertical tab 116 are oriented across from each other so that the shackle 14 can be routed through the shackle slots 122 in the tabs.

As an additional security measure, third lock shroud 123 provides protection against accessing the rear of lock 104. Third lock shroud 123 has a reduced wall height, to provide access to key hole 105. However, third lock shroud 123 has wall height sufficient to guard against a thief lifting lock 104 to gain access to the rear of the lock. Third lock shroud 123 prevents lifting lock 104 to gain access to the rear of lock 104. This provides additional protection from prying lock 104 away from hasp 100. The combination of first lock shroud 110, second lock shroud 107, and third lock shroud 123 provide 360 degree protection for lock 104 to fortify hasp 100 against cutting or prying of lock 104.

Figure 8:
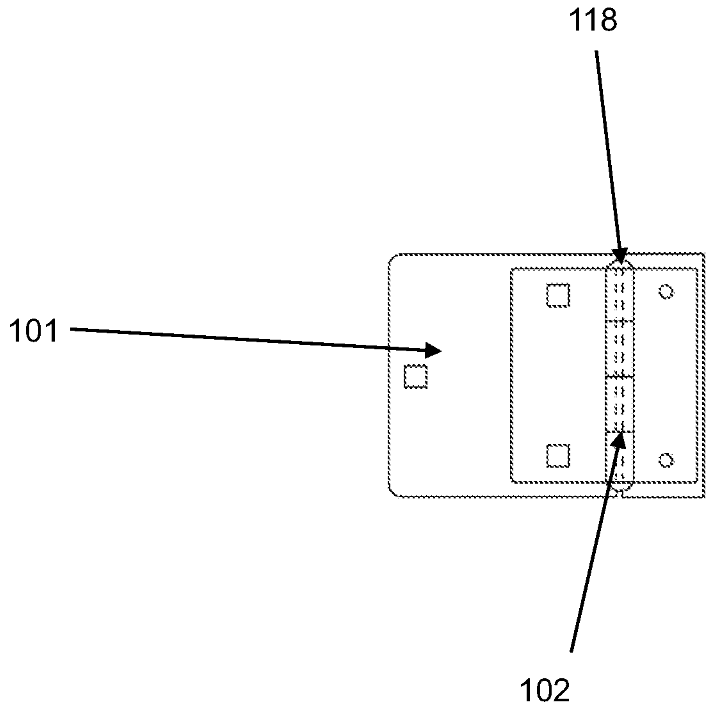
FIG. 8 is a side view of the improved hasp.

FIG. 8 is a side view of the hinge side of the improved security hasp 100. In this view, the first mounting plate 101 is visible in relation to hinge 102. Hinge 102 is welded to first mounting plate 101 using welding methods well known in the art. First mounting plate 101 is attached to the side of a utility cabinet (or any cabinet type opening secured by a door) using attachment methods well known in the art. In the preferred embodiment, first mounting plate 101 is mounted to the side wall of the utility cabinet using a carriage bolt.

Hinge 102 is an antitheft hinge with domed pin 118. The domed top of the hinge, made from hardened steel makes it very difficult to cut with a grinder or other methods, thus improving the security.

Although the present invention has been described in relation to the above disclosed preferred embodiment, many modifications in design, implementation, systems and execution are possible while still maintaining the novel features and advantages of the invention. The preferred embodiment is not meant to limit the scope of the patent in any way, and it should be given the broadest possible interpretation consistent with the language of the disclosure on the whole.

The invention claimed is:

1. A hasp for coupling an opening with a first side and a second side, where the first side is secured to the second side with a hidden shackle padlock, the hasp comprising:

a first securing plate for securing the hasp to the first side of the opening to be secured, the first securing plate having a front side and a rear side;

a hinge with a first side plate, a second side plate and a pin having two ends, where the first side plate is coupled to the front side of the first securing plate to form a stacked structure and where the pin further comprises at least one domed end;

a second securing plate comprising a front side and a rear side, where the second side plate of the hinge is coupled to the front side of, the second securing plate to form a stacked structure, the rear side of the second securing plate coupled to a first security base, the first security base formed as an element separate from the second securing plate, where the first security base is formed of high strength laminated steel comprised of two or more layers of steel joined together by lamination, a first lock base coupled to the front side of the second securing plate, where the first lock base is formed as an element separate from the second securing plate, the first lock base comprising a first lock shroud and a first raised vertical tab, and where the first raised vertical tab comprises a first shackle slot for coupling with shackle of the pad lock; and a third securing plate for securing the hasp to the second side of the opening to be secured, the third securing plate comprising a front side and a rear side, the rear side coupled to a second security base formed as an element separate from the third securing plate, where the second security base is formed of high strength laminated steel comprised of two or more layers of steel joined together by lamination, and the front side comprising a second lock base coupled to the front side of the third securing plate, where the second lock base is formed as an element separate from the third securing base, the second lock base comprising a second lock shroud and a second raised vertical tab, and where the second raised vertical tab comprises a second shackle slot for coupling with the shackle of the pad lock, where the first side of the opening is secured to the second side of the opening when the shackle of the pad lock is coupled with the first shackle slot and the second shackle slot and placed in a locked position.

2. The hasp of claim 1 wherein the second securing plate further comprises a third lock shroud.

3. The hasp of claim 1 where the first securing plate is coupled to the first side of the hinge and second securing plate is coupled to the second side of the hinge by welding.

4. The hasp of claim 1 where the hasp is made from a material selected from the group comprising high strength steel, stainless steel, aluminum, and cast iron.

5. The hasp of claim 1 where the hasp is manufactured using a method selected from the group comprising casting, molding, forging, welding, and CNC cutting.

6. The hasp of claim 1 where the first lock shroud and second lock shroud meet to form an essentially circular shaped shroud around the padlock, where any location on the essentially circular shaped shroud is measured in one of 360 degree increments, where the essentially circular shape including a break to access a key hole of the padlock, where the first lock shroud comprises a top portion and a bottom portion and the second lock shroud comprises a first end and a second end, and where the top portion of the first lock shroud meets the first end of the second lock shroud at a first degree measurement of the essentially circular lock shroud and the bottom portion of the first lock shroud meets the second end of the second lock shroud at a second degree measurement of the essentially circular lock shroud and the absolute value of the difference between the first degree measurement and second degree measurement is not 180.

7. The hasp of claim 1 wherein the combination of the first lock shroud and the second lock shroud forms and essentially circular lock shroud with a center point in the circular shape, and where there are a first gap and second gap between the first lock shroud and the second lock shroud, and where the first gap and the second gap are offset such that a straight line drawn from the first gap through the center point of the circular lock shroud would not intersect the second gap.

* * * * *